United States Patent
Walsh et al.

(10) Patent No.: US 10,027,955 B2
(45) Date of Patent: Jul. 17, 2018

(54) PREDICTIVE NETWORK TESTING

(71) Applicant: VIAVI SOLUTIONS INC., Milpitas, CA (US)

(72) Inventors: Jim Walsh, Westfield, IN (US); Ching-Chang Liao, Fishers, IN (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 0 days.

(21) Appl. No.: 15/448,170

(22) Filed: Mar. 2, 2017

(65) Prior Publication Data

US 2017/0180726 A1    Jun. 22, 2017

Related U.S. Application Data

(60) Continuation of application No. 14/713,454, filed on May 15, 2015, now Pat. No. 9,621,883, which is a division of application No. 13/847,369, filed on Mar. 19, 2013, now Pat. No. 9,036,687.

(60) Provisional application No. 61/612,742, filed on Mar. 19, 2012.

(51) Int. Cl.
| | |
|---|---|
| *H04L 27/00* | (2006.01) |
| *H04N 17/00* | (2006.01) |
| *H04N 21/61* | (2011.01) |
| *H04N 21/647* | (2011.01) |
| *H04B 10/2575* | (2013.01) |
| *H04B 10/073* | (2013.01) |

(52) U.S. Cl.
CPC ........ *H04N 17/004* (2013.01); *H04B 10/073* (2013.01); *H04B 10/25751* (2013.01); *H04N 21/6168* (2013.01); *H04N 21/64738* (2013.01)

(58) Field of Classification Search
CPC ........... H04N 17/004; H04N 21/64723; H04N 21/6168; H04N 17/00; H04B 10/073; H04B 10/25751
USPC ....................................................... 375/324
See application file for complete search history.

(56) References Cited

U.S. PATENT DOCUMENTS

| | | |
|---|---|---|
| 6,278,730 B1 | 8/2001 | Tsui et al. |
| 7,403,486 B2 | 7/2008 | Flask |
| 7,606,165 B2 | 10/2009 | Qiu et al. |
| 7,657,822 B2 * | 2/2010 | Shen .................. H03M 13/256 375/265 |
| 7,796,526 B2 | 9/2010 | Miller |
| 7,944,848 B2 | 5/2011 | Chappell et al. |
| 8,817,867 B1 | 8/2014 | Annampedu et al. |
| 2006/0062330 A1 | 3/2006 | Seo |
| 2007/0217329 A1 | 9/2007 | Abedi |
| 2009/0135946 A1 | 5/2009 | Dowling |

* cited by examiner

*Primary Examiner* — Tanmay Shah
(74) *Attorney, Agent, or Firm* — Mannava & Kang, P.C.

(57) ABSTRACT

The invention relates to a method and apparatus for evaluating a network and for predicting network performance for a higher order modulation by analyzing network signals modulated using a lower order modulation format. A margin index may be generated for the current or projected modulation formats based on displacement vectors for received symbols to indicate a margin remaining before a codeword error occurs to alert the network operator of potential performance issues before actual codeword errors occur.

20 Claims, 8 Drawing Sheets

Hybrid Cable Network

PREDICTIVE NETWORK TESTING

CROSS-REFERENCE TO RELATED APPLICATIONS

The present invention is a Continuation of commonly assigned and co-pending U.S. patent application Ser. No. 14/713,454, filed May 15, 2015, which is a divisional of U.S. patent application Ser. No. 13/847,369, filed Mar. 19, 2013, now U.S. Pat. No. 9,036,687, issued on May 19, 2015, claims priority from U.S. Provisional Patent Application No. 61/612,742 filed Mar. 19, 2012, the disclosures of which are hereby incorporated by reference in their entireties.

TECHNICAL FIELD

The present invention generally relates to testing and monitoring of communication networks, and more particularly relates to systems, methods and devices for testing and monitoring cable networks using QAM modulation formats.

BACKGROUND OF THE INVENTION

Modern communication systems employ various modulation formats to transmit information over one or more carriers. Accordingly, performance of such systems may be sensitive to the used modulation format.

Digitally modulated signals are used to transport high-speed data, video and voice on cable networks. The high-speed signals are subject to a variety of impairments that can seriously impact the quality and reliability of the services being provided. Operators and technicians responsible for the performance of a cable network have to be able to measure the high-speed signals on their network in order to understand how well the system is working and to determine the root cause of degradation to the delivery of services to their customers. In order to measure a signal, current test equipment requires the user to enter certain parameters in order to define the signal to be measured.

Two-way hybrid fiber-coaxial (HFC) networks are shared bi-directional networks with point-to-multipoint transmission in the downstream direction, and multipoint-to-point transmission in the upstream direction. Signals are distributed via a fiber optic connection from a head-end to a node that converts the optical signal to an electrical signal, and then distributes the signals to residences via a tree and branch coaxial cable distribution network. At the subscriber side, terminal equipment supports the delivery of cable services (video, data and voice services) to subscribers, via cable modems. Data and voice services are supported by cable modems and communication gateways, respectively, which require the use of an upstream signal path. The network uses a fiber optic upstream signal path from the node to the head-end. A return band is used to support transmissions from devices at subscribers' premises back to the head-end. In such networks, many cable modems may compete for communication bandwidth in both the upstream and downstream directions.

Delivery of data services over cable networks, and in particular cable television (CATV) networks, is typically compliant with a Data Over Cable Service Interface Specifications (DOCSIS®) standard. The term 'DOCSIS' generally refers to a group of specifications published by Cable-Labs that define industry standards for cable headend equipment, such as Cable Modem Termination System (CMTS), and cable modem (CM) equipment. Subscribers send data from their digital devices, such as personal computers (PC), VoIP phones, Video IP devices, etc, into the CM, which then relays the data to the CMTS, which in turn relays the information to an appropriate network element. Information destined to the subscriber digital device is provided from the network to the CMTS, which in turn relays the information to the CM. The CM in turn relays the information to the subscriber's digital device. The communication direction from the CMTS to the CM is referred to as the downstream direction, while the communication direction from the CM to the CMTS is referred to as the upstream direction.

The physical layer specification of DOCSIS provides for the use of frequency multiplexing and several specific forms of quadrature amplitude modulation (QAM) for both upstream (CM to headend) and downstream (headend to CM) communications. At the moment of writing, the physical layer specification of the most current version of the DOCSIS standard, DOCSIS 3.0, provides for a normal downstream operating range from 50 MHz to 1002 MHz, with either 6 MHz or 8 MHz spacing for downstream channels, which utilize 64-QAM or 256-QAM modulation format. The upstream operating frequency range may be between 5 and 42 MHz, or 5 to 85 MHz. The upstream channel widths are configurable and may take a set of define values be between 200 kHz and 6.4 MHz, each corresponding to a specific symbol rate, with the upstream data modulated with either QPSK, 8-QAM, 16-QAM, 32-QAM, 64-QAM or 128-QAM.

One technical challenge in operating a network having a bidirectional communication path on a shared medium between the headend and each remote point is maintaining network integrity for upstream and downstream signals. Noise and other undesirable energy originating at one remote point or at any point along the return path from that remote point can impair network communications for all remote points in the network. Similarly, where noise and undesirable energy from one remote point is combined with noise and or other RF impairments from other remote points in the network, network communications may be impaired. RF impairments may occur in many forms including, but not limited to, impulse and/or burst noise, common path distortion, and ingress such as interference from radio communication and navigation signals. Impulse noise or burst noise typically consists of high-power, short-duration energy pulses. Ingress is unwanted RF energy that enters the communication path from a source external to the communication path. Ingress often comprises radio and/or navigational communication signals propagated over the air that enter a weak point in a wireline network, although it may also comprise impulse and/or burst noise that is similarly propagated over the air to enter the network at a weak point. Weak points in the network often occur where there is a cable shield discontinuity, improperly grounded electrical device, or a faulty connector at or near a remote point. When radio frequency carriers from shortwave radio, citizen's band radio, or other broadcast sources enter the network at these weak points, they may cause interference peaks at specific carrier frequencies in the communication path. Common path distortion may be the result of second and higher order mixing products from the downstream channel that couple to the upstream channel; such nonlinear mixing may occur, for example, when physical electromechanical connectors corrode and oxidize, creating point contact diodes.

Therefore, an ability to monitor the performance of the cable network and to quickly and efficiently isolate impairments in the cable network is essential for the cable network operation. MSO's (Multiple System Operators) do not have a simple way to determine margin available before impairments present in their plant will trigger degradation in HFC (Hybrid Fiber Coaxial) plant metrics commonly associated with indicating noticeable degradation in subscriber services. They also do not have a way of predicting whether carriers will perform acceptably at higher-order modulations without actually turning up the higher order modulation and potentially disrupting subscriber's services in the process.

It is therefore an object of the present invention to provide a method and apparatus for network testing that overcome at least some of the disadvantages and limitations of the prior art by utilizing more informative symbol-level performance metrics and/or metrics predictive of the network performance for different modulation formats.

SUMMARY OF THE INVENTION

Accordingly, the present invention relates to a method for evaluating a network using a network tester comprising a processor. The method comprises: a) receiving from the network a communication signal modulated using a first modulation format; b) demodulating the communication signal to obtain a sequence of received symbol samples and a sequence of modulation symbol decisions of the first modulation format corresponding to the sequence of received symbol samples; c) computing displacements of the received symbol samples with respect to the modulation symbol decisions corresponding thereto; and, d) comparing the displacements of the received data samples obtained in step (c) to decision thresholds associated with a second modulation format to evaluate network performance for the second modulation format.

One aspect of the present invention provides a method that includes estimating error margins for a plurality of received symbol samples for the first or second modulation formats based on the displacements of the received symbols relative to the symbol decisions of the first modulation format, computing a margin score based on the estimated error margins, and displaying the margin score using a graphical user interface.

A further aspect of the present invention relates to an apparatus for predictive network testing, which comprises: a receiver configured for receiving a communication signal from the network and for extracting therefrom a carrier signal modulated using a first modulation format; a demodulator of the first modulation format for demodulating the carrier signal and for obtaining therefrom a sequence of received symbol samples; a slicer of the first modulation format for obtaining a sequence of modulation symbol decisions of the first modulation format from the sequence of received symbol samples, and a symbol processor that is configured for computing displacements of the received symbol samples with respect to the modulation symbol decisions of the first modulation format, and comparing the vector deviations of the received symbol samples obtained in step (c) to decision thresholds associated with a second modulation format to evaluate network performance for the second modulation format.

A further aspect of the present invention provides a method for evaluating a network, which comprises: a) receiving from the network a communication signal modulated using a first modulation format; b) demodulating the communication signal to obtain a sequence of received symbol samples; c) making hard decisions on the received symbol samples based on a first set of decision boundaries that are associated with the first modulation format to obtain a sequence of modulation symbol decisions of the first modulation format corresponding to the sequence of received symbol samples; d) computing displacements of the received symbol samples with respect to the modulation symbol decisions obtained using the first set of decision boundaries; and, e) comparing the displacements of the received symbol samples obtained in step (d) to one or more decision thresholds associated with a second set of decision boundaries that are tighter than the first set of decision boundaries to obtain a measure of network performance in the absence of symbol errors for the first modulation format. The second set of decisions boundaries may be associated with a second modulation format that is different from the first modulation format, or it may correspond to guarded decision boundaries of the first modulation format.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. The appearances of the phrase "in one embodiment" in various places in the specification are not necessarily all referring to the same embodiment, nor are separate or alternative embodiments mutually exclusive of other embodiments.

The following is a partial list of acronyms that may be used in the present specification:
HFC Hybrid Fiber-Coaxial
LAN Local Area Network
HFC Hybrid Fiber-Coaxial
FPGA Field Programmable Gate Array
QAM Quadrature Amplitude Modulation
CPE Customer Premises Equipment CMTS Cable Modem Termination System
RF Radio Frequency
IF Intermediate Frequency
ROM Read Only Memory
RAM Random Access Memory
ADC Analog to Digital Converter
DDC Digital Down Converter
MER Modulation Error Ratio
BER Bit Error Rate
FPGA Field Programmable Gate Array
ASIC Application Specific Integrated Circuit
DOCSIS Data Over Cable Service Interface Specification
OCAP Open Cable Application Protocol M-QAM refers to a QAM format wherein each modulation symbol can take one of M possible values, wherein integer M is referred to as the (QAM) modulation order. In preferred embodiments $M=2^n$, wherein integer n is a number of bits required to represent one QAM symbol.

Note that as used herein, the terms "first", "second" and so forth are not intended to imply sequential ordering, but rather are intended to distinguish one element from another unless explicitly stated.

Exemplary embodiments of the present invention will be described hereinabove with reference to a cable TV network implementing data services according to Cable Television Data-Over-Cable Service Interface Specification (CATV DOCSIS) or Open Cable Application Protocol (OCAP) communication scheme, such as that illustrated in FIG. 1. It will be appreciated however that the present invention can also be used in other types of networks using multi-level modulation symbols to transmit data, including but not limited to those using QAM formats, such as for example DVB-T based digital TV systems, OFDM-based wireless networks using QAM modulated subcarriers, DSL networks, and other types of networks as would be evident to those skilled in the art on the basis of the present description Furthermore, the term 'data' is used herein broadly and encompasses digital video and audio data unless clearly stated otherwise.

Figure 1:
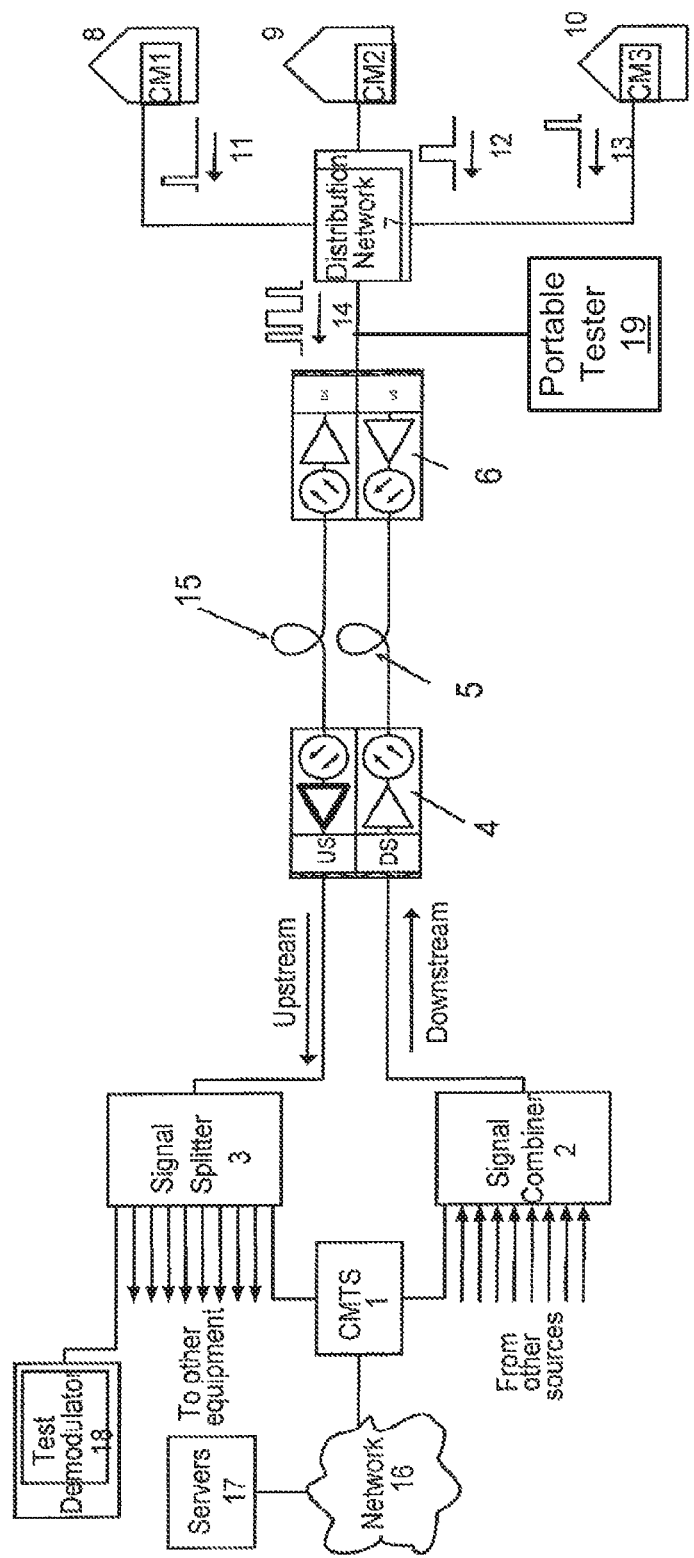
FIG. 1 is a schematic representation of a CATV network.

With reference to FIG. 1, there is illustrated an exemplary cable TV network with DOCSIS or OCAP internet access, as described for example in U.S. Pat. No. 7,944,848, which is incorporated herein by reference. A Cable Modem Termination System 1 (CMTS) has three connections: 1) a network interface to servers 17 via the internet 16; 2) downstream control and data delivery via a signal combiner 2; and 3) upstream control and data reception via a signal splitter 3. FIG. 1 illustrates one "Node" of a CATV plant, which serves up to 200 homes with DOCSIS or OCAP service. Often a "Hub" will have over one hundred Nodes and a city the size of Indianapolis can have five or six hub sites.

The downstream signal of the CMTS 1 is coupled with the other signals, e.g. TV, Test, Telephony or others, via the Signal Combiner 2. The output of the Signal Combiner 2 is connected to a Fiber Transceiver Node 4, which converts the combined downstream signal suite from RF signals to optical signals, and delivers the combined signal suite to a remote location via a fiber optic link 5. The downstream optical signals are converted back to RF signals at a Transceiver Node 6, which is also optically coupled to the optical link 5. The RF signals from the transceiver node 6 are delivered to different residences via a cable Distribution Network 7. Certain residences 8, 9 and 10 use cable modems CM1, CM2 and CM3, respectively. A control signal from the CMTS 1 is detected and demodulated by each of the cable modems CM1, CM2 and CM3. When a cable modem, e.g. CM1, CM2 or CM3, wants to talk back to the CMTS 1, the cable modem will wait until the CMTS 1 indicates that the upstream path is free, the cable modem then requests a time slot from the CMTS 1 via an upstream signal. The upstream signal is coupled to the distribution network 7, and then converted to an optical signal at the fiber transceiver 6. The upstream optical signal travels back to the hub site or head-end via optical cable link 15, where the fiber transceiver 4 optically connected to the optical cable link 15, converts the upstream optical signal back to an RF signal. The upstream RF signal is then routed to the signal splitter 3, where a portion of the upstream signal is sent to the CMTS 1. The CMTS 1 thus becomes the link between the cable modems CM1, CM2 and CM3 and the servers 17 via the internet 16.

Time division multiplexed access (TDMA) is typically employed in a communication link, since each cable modem CM1, CM2 and CM3 is randomly picking a time to request upstream signal transmissions, and packet sizes from the cable modems CM1, CM2 and CM3 vary. Various other systems and features can be applied which extend the behavior and improve noise immunity, but TDMA is generally used. The cable modem transmissions, i.e. bursts, are at random intervals from an outsider's point of view. Each cable modem CM1, CM2 and CM3 will transmit a packet or series of packets in either a blank time slot identified by the CMTS 1 or into a scheduled timeslot assigned by the CMTS 1. The distribution network 7 combines all of the CM packet series 11, 12 and 13 together into a single upstream signal 14, whereby all of the individual series are indistinguishable from an outside observer. OCAP operates similarly to the DOCSIS protocol and engineers familiar with the state of the art would see the commonalties and differences, in particular OCAP is used for set-top box command and control. By way of example, a DOCSIS packet may include several codewords mapped by a CM transmitter onto modulation symbols such as 16-QAM or 64 QAM. Each codeword (CW) is generated by a FEC encoder of the CM transmitter, which may be preceded by a bit randomization mapping including interleaving and or scrambling, and contains k data bytes and 2*T parity bytes. A typical 64-QAM packet may include 5-8 CWs, with typically 100-255 Bytes per codeword.

Network testing and monitoring tasks may be performed using a variety of network testers, including stationary network testing equipment such as s testing device 18 that may be connected to the signal splitter 3 at the headend node, and a portable tester 19 that can be connected to the cable portion of the network at a desired location to measure either upstream or downstream signals. In operation, tester 18 or 19 demodulates the combined upstream or downstream signal received from the cable plant at the corresponding location for multiple packets.

Figure 2:
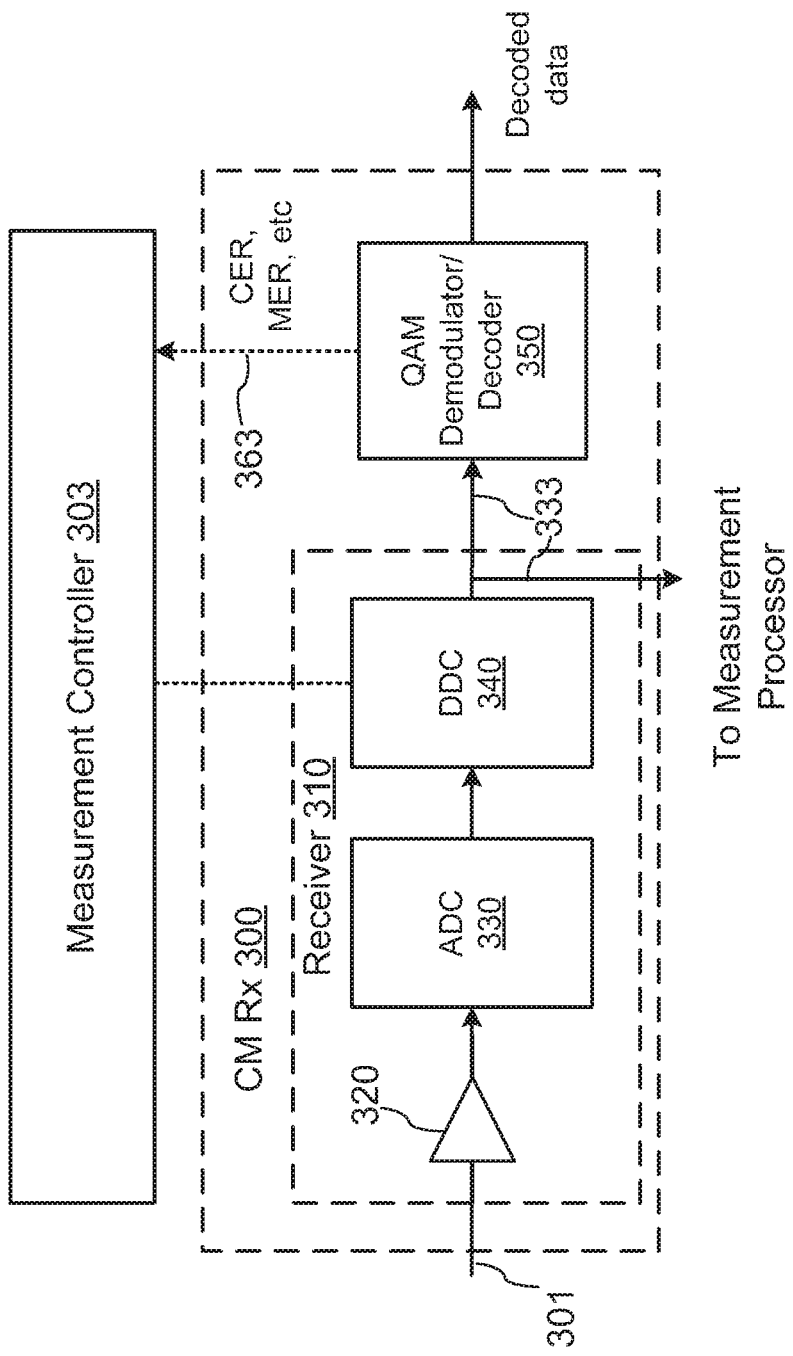
FIG. 2 is a simplified block diagram of a portion of a CATV tester.

With reference to FIG. 2, an exemplary tester device may include a DOCSIS-compatible cable modem receiver circuit (CM Rx) 300 which may be comprised in an ASIC embodying a cable modem chip. A communication signal 301, which received from the cable plant in the form of an RF signal, is first passed to a wide band tuner/receiver 310, which may typically include a low-noise preamplifier (LNA) 320, followed by a wide-band analog-to-digital (ADC) converter 330, which is in turn followed by a digital down-converter (DDC) 340. In another embodiment, the ADC 330 may be preceded by a wideband analog tuner, which may be shared between multiple receivers. The analog tuner is optional because all tuning processes can be performed purely digitally using one or more ADCs and DDCs.

DDC 340 outputs a digitized modulation signal for a particular carrier, which is also referred here as a carrier signal, in the form of a baseband sequence of carrier signal samples for a particular channel. This digitized signal is then passed to a QAM demodulator/decoder 350 for demodulation and decoding. The QAM demodulator/decoder 350 converts the DDC output into a sequence of received symbol samples, and maps them to bit sequences based on the known modulation format of the signal in the measured channel and a known bit to symbol mapping scheme. The QAM modulator/decoder 350 also performs error correction, error detection, de-interleaving and/or de-scrambling operations on the bit sequences mirroring those that were performed on the channel data at the transmitter as known in the art. The QAM demodulator 350 may include an adaptive equalizer (EQ) (not shown) as known in the art. Details of these and other relevant data operations in the context of DOCSIS® 3.0 compliant systems are described for example in the following DOCSIS® 3.0 standards documents, the contents of which are incorporated herein by reference: SP-CMCIv3.0 2008, Cable Modem to Customer Premise Equipment Interface Specification; SP-PHYv3.0 2010 Physical Layer Specification; SP-MULPIv3.0 2011 MAC and Upper Layer Protocols Interface Specification; and SP-OSSIv3.0 2011 Operations Support System Interface Specification.

In the context of the instant specification, the modulation format that was used at the transmitter for the channel or carrier being measured is also referred to herein as the first modulation format, or the current modulation format.

The DDC 340 is responsible for filtering out, i.e. selecting, a particular upstream or downstream channel, such as a DOCSIS 6 or 8 MHz wide channel, from the digital output of the ADC 330. In one embodiment, it converts a digitized real-valued signal centered at an intermediate frequency to a baseband complex digital signal as known in the art. This complex baseband digital signal may be composed of an in-phase signal component 'I' and a quadrature signal component 'Q'. The DDC 340 may be controlled by a measurement controller 303 for tuning to a selected channel or group of channels. The QAM demodulator/decoder 350 can be queried by the measurement controller 303 to perform a number of measurements, including measuring MER (modulation error ratio) as known in the art. The controller 303 may further read various performance-related data from the demodulator/decoder 350 to perform a variety of service level tests. For example, conventional DOCSIS decoders typically have rate counters and packet error counters that can be read by the controller 303 to measure the following parameters for a corresponding channel: pre-FEC and post-FEC Bit Error Rate (BER), and pre-FEC and post-FEC Codeword Error Rate (CER).

One disadvantage of the conventional performance metrics such as BER and CER is that they are reactive rather than pro-active, in that they can only measure errors that have already happened. Other conventional metrics such as MER represent averages over a large number of codewords and packets, and may not be sufficiently sensitive to detect when an individual symbol or a small percentage of symbols become close to an error threshold. Another drawback of the conventional testing techniques is that they only provide metrics which relate to the network performance for the modulation format that is currently in use, and give little to know information that would enable the network operator to predict the network performance when terminal equipment of the network is upgraded to a different modulation format, for example a higher-order QAM modulation format, for example when the network is upgraded from a first modulation format $M_1$-QAM to a second modulation format $M_2$-QAM where $M_2 > M_1$. Here, $M_1$ and $M_2$ could be one of 2, 4, 8, 16, 32, 64, 128, 256, 1024, 2048, 4096 etc, with 16-QAM, 64-QAM and 256-QAM being currently most common; 2-QAM is also referred to as BPSK, and 4-QAM is also referred to as QPSK.

Accordingly, one aspect of the present invention relates to a method and a related device for providing performance-predictive metrics that enable cable operators to take corrective actions on the network before symbol and/or codeword errors start to occur, either for a currently used modulation format or for a different modulation format that is not currently in use in the network, or at least for a particular network link being tested. In one embodiment, it includes measuring a margin-to-error performance characteristic on a per-symbol or per-codeword base, which characterize a margin before a symbol and/or codeword error occurs.

Figure 3:
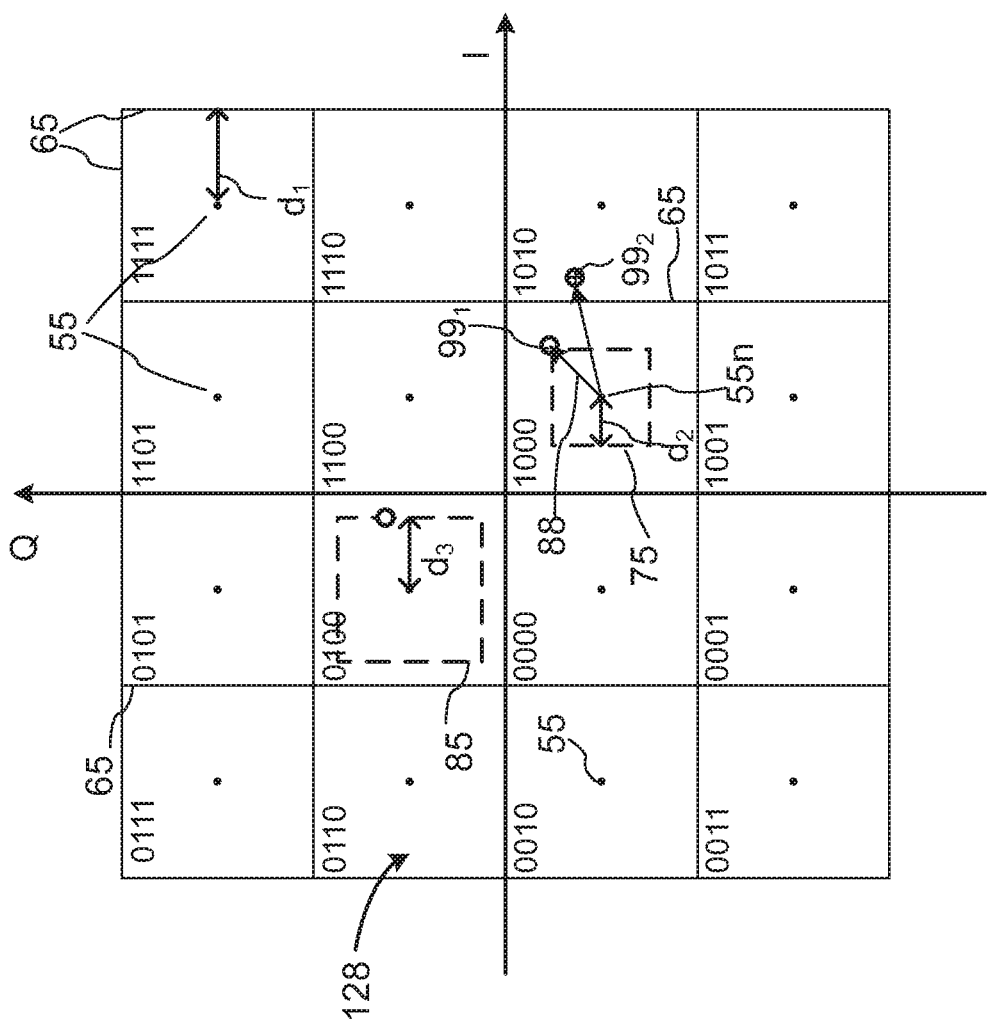
FIG. 3 is a graphical representation of 16-QAM symbols and symbol decision boundaries therefor in an I,Q plane overlaid with QAM-64 decision boundaries for one 16-QAM symbol value.
Figure 4:
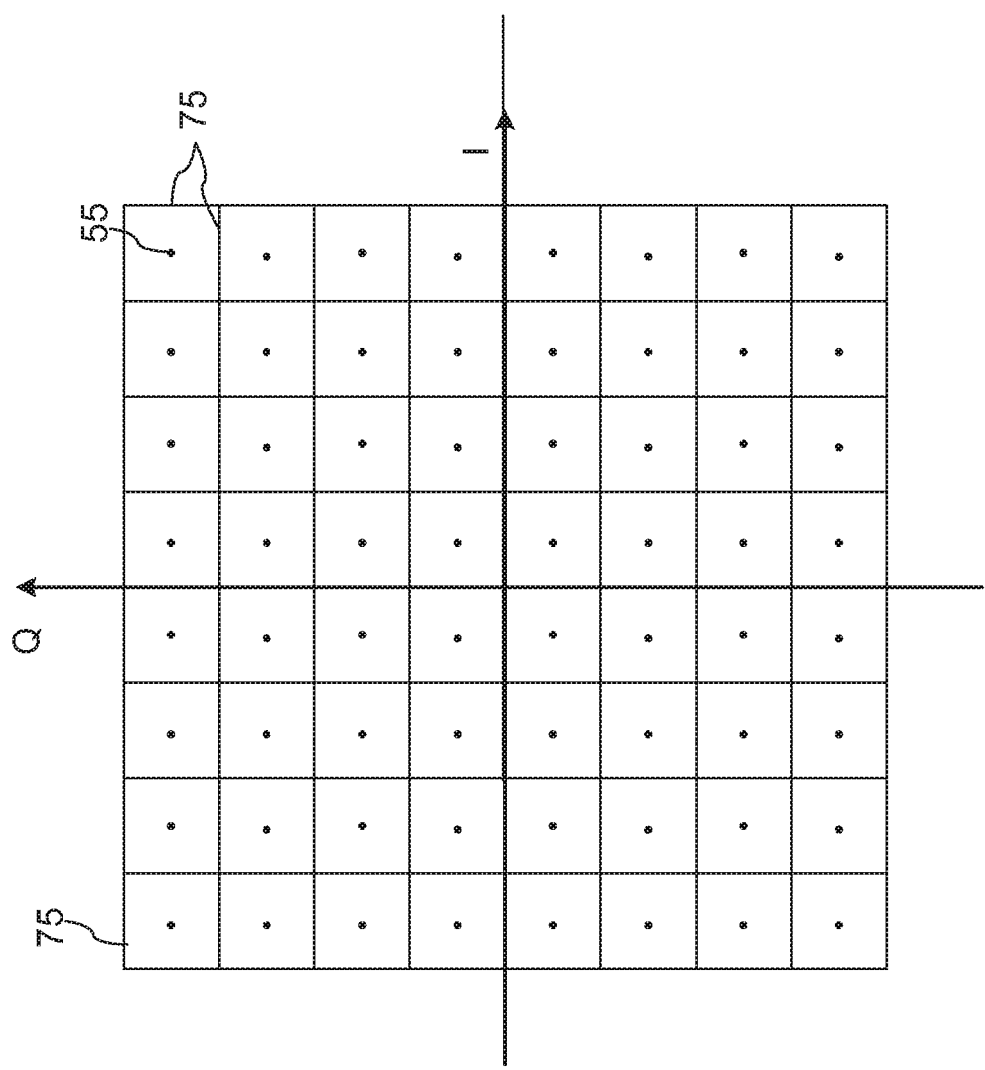
FIG. 4 is a graphical representation of 64-QAM symbols and symbol decision boundaries therefor in an I,Q plane.

By way of example and with reference to FIG. 3, the channel signal selected by the DDC 340 may be modulated at the transmitter using 16-QAM format, wherein each modulation symbol $Y_m$ may take one of 16 possible complex values. FIG. 3 shows these values in an I, Q plane as dots 55, each defined by a pair of I and Q values or coordinates. For 16-QAM, decision boundaries 65 form a 4×4 square grid having 16 square cells 128, with one of the 16-QAM symbols 55 centering each square cell of the grid. The number of the cells in the grid is defined by the QAM modulation order M, so that decision boundaries for 64-QAM symbols form a 8×8 square grid, which each 64-QAM cell being one half of the 16-QAM cell in each of the I and Q directions, as illustrated in FIG. 4. A QAM slicer within the QAM demodulator/decoder maps each square 128 formed by the decision boundaries 65 to a sequence of n bits, with $n=\log_2(M)$, according to a predetermined mapping scheme mirroring that used at the transmitter. One example of the mapping is known as Gray coding, which has the advantage that crossing each boundary 65 in the direction of either I or Q axis changes the value of only a single bit from the sequence. In FIG. 3, 4-bit binary labels in the top-left corner of each cell illustrate an exemplary Gray mapping of 16-QAM symbols to 4-bit sequences. Due to non-ideal receivers and transmitters and communication channel distortions, the received symbol samples 99 that are measured by the QAM demodulator from the output of the DDC, which are also referred to herein as the raw QAM symbols or soft QAM symbols and denoted $Yr=(Ir, Qr)$, typically deviate from their ideal locations at cell centers 55 corresponding to the true QAM symbols $Y_m=(I_m, Q_m)$, $m=1, \ldots, M$. A symbol sample 99 that falls within one of the square cells 128 is mapped to the 4-bit sequence corresponding to that square. Signal impairments in the communication channel may cause some of the symbol samples 99 to deviate relatively far from their corresponding transmitter-defied symbols, resulting in a symbol error when the raw symbol crosses one of the decision boundaries 65 into a neighboring cell. By way of example, a symbol sample $99_1$ corresponding to the transmitter QAM symbol $55n$ will be correctly mapped to '1000', while symbol sample $99_2$, which corresponds to the same transmitter QAM symbol $55n$, but which falls into the neighboring cell, will be mapped to '1010', resulting in a byte error. A byte-level data packet corruption resulting from displacement of individual QAM symbols across the constellation decision boundaries is referred to as a codeword error (CWE). The FEC decoder will correct a CWE provided that the number of byte error does not exceed T, i.e. one half of the parity bytes in the CW, in which case the CWE is referred to as correctable; otherwise, the CWE is referred to as uncorrectable. Uncorrectable CWEs result in dropped packets, requiring packet retransmission for protocols that allow it, or information loss for protocols that do not allow for packet retransmission. Correctable CWEs are an early-warning that uncorrectable errors may be near. However, prior-art testers do not provide any warnings when some of the detected symbols are nearing a decision boundary as long as no CWEs are detected.

Advantageously, an aspect of the present invention provides a method to quantify a margin before symbol errors may occur in a QAM carrier. Such margin may be estimated by comparing symbol displacements 88 from their ideal locations 55 to decision thresholds defined by the decision boundaries 65, either guarded or unguarded, and quantifying a relative distance to the threshold.

Furthermore, the network operator may be interested in a projected performance of the network when upgraded to a different modulation format, such as but not exclusively to a higher-order QAM. However, different modulation orders afford different magnitudes of the symbol displacement 88 before decision boundaries are crossed. For example, FIG. 3 illustrates decision boundaries 75 for 64-QAM overlaid onto the 16-QAM symbol decision grid for an exemplary 16-QAM symbol value 55$n$. As can be clearly seen, same magnitude of the symbol displacement 88 that may not cause a CWE on a packet modulated at 16-QAM, will cause a CWE if the packet were to be modulated at 64-QAM. Accordingly, another aspect of the present invention provides a method of estimating a projected network performance after switching from a first modulation format to a second modulation format based on measurements done only for the first modulation format. By way of example only, embodiments described hereinbelow may be described with reference to 16-QAM as the first modulation format, and 64-QAM as the second modulation format, although the present invention is not limited thereto.

With reference to FIG. 4, one embodiment of the present invention provides a network tester 100 that is capable of such predictive testing. The tester 100, which can be used to embody the stationary testing equipment 18 and/or the portable tester 19, includes a receiver unit 205, such as the front-end receiver/tuner 310 of the CM Rx 300, which connects to a measurement processor (MP) 200 that is configured to provide predictive symbol-based and codeword-based metrics. A measurement controller (MC) 270 may also be provided for performing the measurement control and result aggregation functions such as those described hereinabove with reference to the measurement controller 303, as well as additional score generating functions described hereinbelow, and may also provide a user interface, such as a graphical user interface (GUI), for defining test parameters and displaying or otherwise outputting the results. In the illustrated embodiment, the MP 200 includes a QAM demodulator 215, a QAM slicer 220, and a symbol processor 260 which includes a symbol displacement computer (SDC) 225, a symbol margin computer (SMC) 230 that is coupled to a decision boundaries (DB) memory unit 250 for storing format-dependent decision boundaries, and a CWE computer (CWEC) 245.

The processor 200 may be embodied using a single dedicated or shared hardware processor or using multiple hardware processors. In one embodiment, the processor 200 runs a measurement software or firmware program or programs including computer instructions for performing operations described hereinbelow with reference to blocks 215, 220, 225, 230, 235; functionality of this measurement software program will become apparent from the description hereinbelow. In one embodiment, a measurement software program executable by the processor 200 is stored in a non-volatile memory (not shown) that is coupled to the processor 200. In operation, this measurement program may run as separate tasks within a main CATV testing software program that also includes instructions embodying functionalities of the measurement controller 270 on the same processor 200, or it could be a separate measurement program that runs on the same or different hardware processor. Functionality of this measurement software program will become apparent from the description hereinbelow. The measurement processor 200 may also be embodied using an FPGA, an ASIC, or a combination thereof, with one or more of the functional blocks of the measurement processor 200 implemented using hardware logic.

The operation of tester 100 will now be described with reference to FIG. 5, and further with reference to method flowcharts shown in FIGS. 5 to 8, which illustrate embodiments of the method for evaluating a network according to the present invention.

Figure 5:
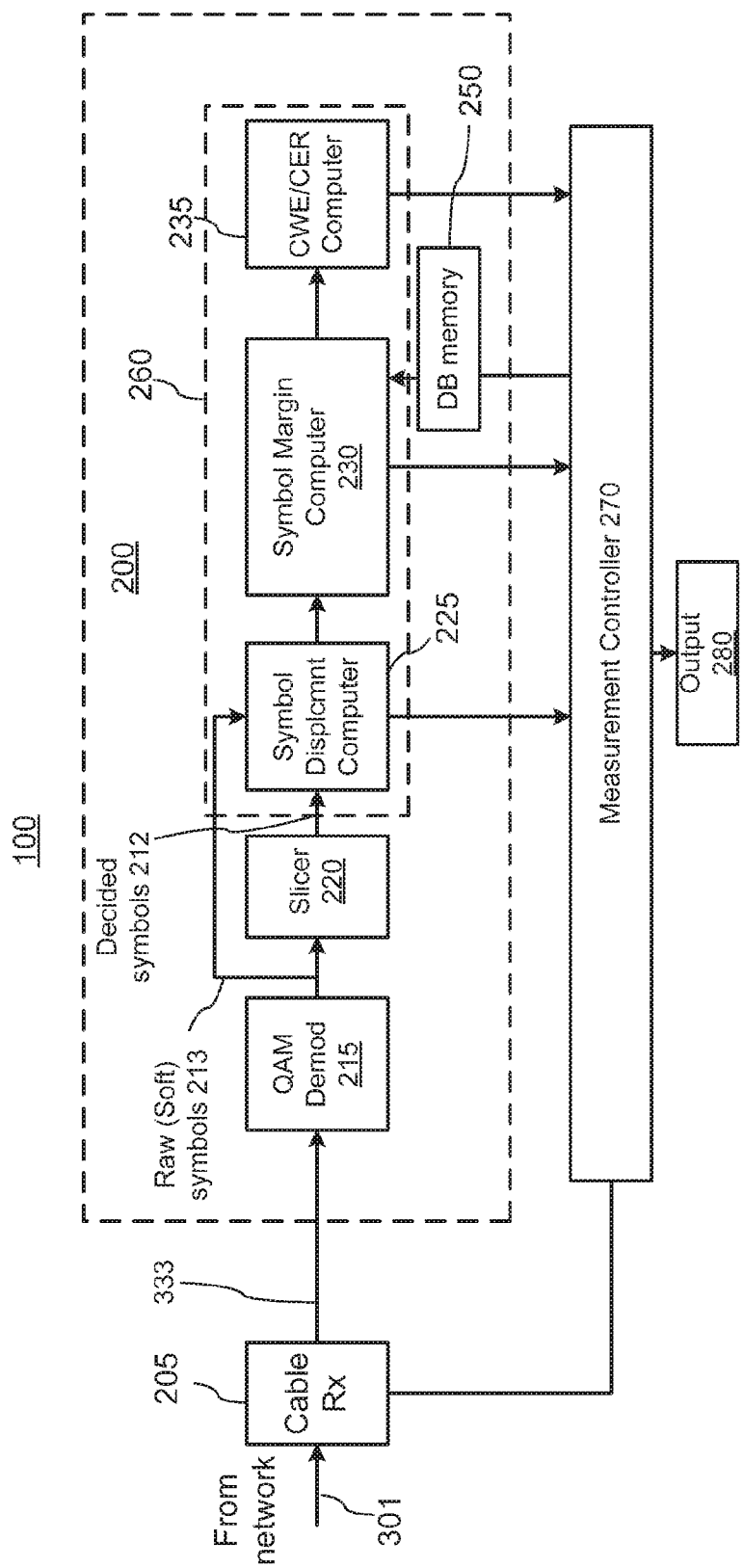
FIG. 5 is a schematic block diagram of a network tester in accordance with an embodiment of the present invention.
Figure 6:
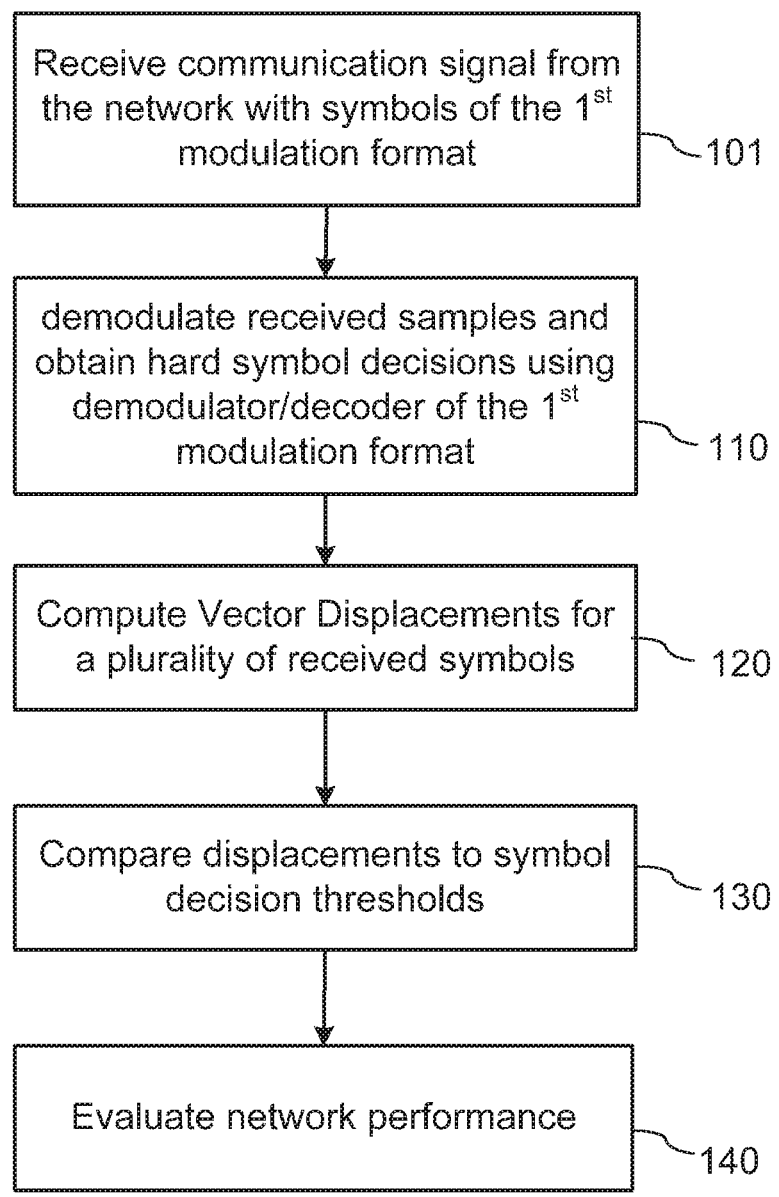
FIG. 6 is a flowchart illustrating steps of a method for evaluating a network in accordance with an embodiment of the present invention.

Turning first to the flowchart of FIG. 6 while continuing to refer to FIG. 5, at step 101 tester 100 receives the RF communication signal 301 that is modulated with modulation symbols of the first modulation format, such as for example 16-QAM. At step 110, the communication signal 301 is processed to obtain therefrom received symbol samples Yr and hard symbol decisions Ym. This step includes using the receiver 205 to convert the received communication signal 301 into the digitalized carrier signal 333 comprised of I and Q signal samples, for example using a DDC as described hereinabove with reference to FIG. 3. The sequence of signal samples 333 is then passed to the QAM demodulator 215 of the first modulation format for demodulation. During the demodulation, which may include one or more operation such as resampling, carrier frequency correction, symbol timing correction, equalizing, etc., as known in the art, the QAM demodulator 215 produces a sequence of raw modulation symbols $Y_r$, which are then passed to the slicer 220 of the first modulation format. Each of the raw modulation symbols $Y_r$ may be in the form of a pair of I and Q values, $Y_r=(I_r,Q_r)$. The slicer 220 makes hard decisions thereupon based on the decision boundaries 65, and converts them into the 'hard' modulation symbols $Y_m=(I_m, Q_m)$ of the first, or current, modulation format, such as 16-QAM symbols 55 shown in FIG. 3. The hard modulation symbols $Y_m$ may then be passed to a mapper (not shown) to map them onto corresponding bit sequences using a predefined mapping rule, for example based on the Gray coding as illustrated in FIG. 3.

At step 120, the soft modulation symbols $Y_r$ and their corresponding hard symbol decisions $Y_m$ are passed to the symbol displacement computer 225 for computing vector deviations D of the raw modulation symbols $Y_r$ with respect to the corresponding hard symbol decisions $Y_m$. By way of example, these vector deviations, also referred to herein as symbol displacements, may be represented in terms of pairs of I and Q values as $D=(D_i, D_q)$ where $D_i=(I_m-I_r)$, $D_q=(Q_m-Q_r)$ are 'I' and 'Q' components of the displacement vector 88, i.e. its projections onto the I and Q axes.

At step 130, the symbol displacements are passed to SMC 230, which compares them to decision boundaries retrieved from DB memory unit 250; results of this comparison is then used at step 140 to evaluate network performance. The DB memory 250 may store information related to one or more sets of decision boundaries, such as for one or more modulation formats, and/or for one or more guard intervals.

In one embodiment, the DB memory 250 stores the decision boundaries, or information related thereto, for the first modulation format that is currently used by the network for the measured channel, and a second modulation format, such as a higher-order QAM format. By way of example, the DB memory stores the decision boundaries 65 for 16-QAM as the first modulation format, and also stores the decision boundaries 75 for 64-QAM as the second modulation format. Step 130 may then include comparing the vector deviations D 88 of the received symbol samples 99 to decision thresholds associated with the second modulation format, which is referred to herein as the second decision threshold. In one embodiment, this may in turn include comparing each of the I and Q components Di, Dq of the symbol displacement vector D for each received symbol to corresponding thresholds $d_i$ and $d_q$, and counting the number of received symbols for which the absolute values of Di or Dq exceed the corresponding decision threshold to determine the number of symbol errors. In one embodiment, the number of received symbols for which the magnitude |D| of the symbol displacement vector D exceeds $d_i$ or $d_q$ is counted to determine the number of projected errors.

The following description, by way of example only, refers to exemplary embodiments related to M-QAM formats wherein M is a power of 4, such as 16-QAM and 64-QAM. In these embodiments, the decision boundaries form a square grid so that the I and Q thresholds are equal, i.e. $d_i=d_q=d$, and a single decision threshold d may be used for both I and Q components. Here, the decision threshold d may be defined by guarded or unguarded decision boundaries for the first and second modulation format, with 2d being the size of a guarded or unguarded QAM cell along the I or Q axes, or the I and Q decision range. With reference to FIG. 3, in the following we will denote unguarded and guarded decision thresholds for the first modulation format as $d_1$ and $d_3$ respectively, while a decision threshold for the second modulation format is denoted as $d_2$. Here, $2d_2$ defines the size of one side of the 64-QAM cell bounded by the second decision boundary 75, as illustrated in FIG. 3.

In one embodiment, SMC 230 computes, for each received symbol sample 99, a symbol margin-to-error value $S_{m2e}$ for the first and/or second modulation format, which indicates a distance to a nearest second decision boundary 65 or 75. The $S_{m2e}$, which is also referred to simply as the symbol margin or, for the second modulation forma, as the projected symbol margin-to-error or a projected symbol margin, may be computed for example as a lesser of the two distances (d−Di) and (d−Dq) of the symbol 99 to its nearest I and Q boundaries for the corresponding guarded or unguarded modulation format. In one embodiment, the computation of $S_{m2e}$ may include comparing the magnitude |D| of the deviation vector D to the decision threshold d, such as according to a formula $S_{m2e} \sim (d-|D|)$.

In one embodiment, SMC 230 may count the number of symbols $N_g$, either per unit time or per codeword, within a pre-defined margin $g=(d_1-d_3)$ from the error boundary 65 for the first modulation format, and pass it to the output generator 255 as an indicator of the network health. In one embodiment, SMC 230 may do that for two or more margin values g. By way of example, SMC may compute the number $N_{3dBc}$ of symbols within 3 dBc (decibels relative to the carrier) of decision boundary for the first modulation format, and/or the number $N_{1dBc}$ of symbols within 1 dBc of decision boundary for the first modulation format.

In one embodiment, SMC 230 computes, for each symbol sample 99, the projected symbol margin-to-error value $S_{m2e}$ for the second modulation format, which indicates a distance to a nearest second decision boundary 75. In one embodiment, SMC 230 may compute the number $N_{3dBc}$ of symbols within a first pre-defined margin, for example 3 dBc, of the decision boundary 75 for the second modulation format, and/or the number $N_{1dBc}$ of symbols within a second pre-defined margin, for example 1 dBc, of the decision boundary for the second modulation format.

When a symbol 99 crosses a second decision boundary, which may be indicated by a corresponding symbol margin $S_{m2e}$ for the second modulation format becoming negative, a projected symbol error is detected, and information regarding the corresponding symbol is passed to the CWE computer 235. The CWE computer 235 maps symbols 99 to corresponding bit sequences as described hereinabove, concatenates the bit sequences into codewords, and counts the number of projected symbol errors per a codeword. In one embodiment, CWE computer 235 counts a number of codewords having at least one projected byte error to compute a CER value. In one embodiment the CER computer may also be configured to compute the number of projected byte errors per one codeword of the second modulation format, determine whether a particular projected CWE would be correctable by a particular FEC based on a ratio of a number of byte errors in a codeword to the number of parity bytes 2T that the FEC adds to the codeword, and determine the projected CER values separately for correctable and uncorrectable CWEs.

Figure 7:
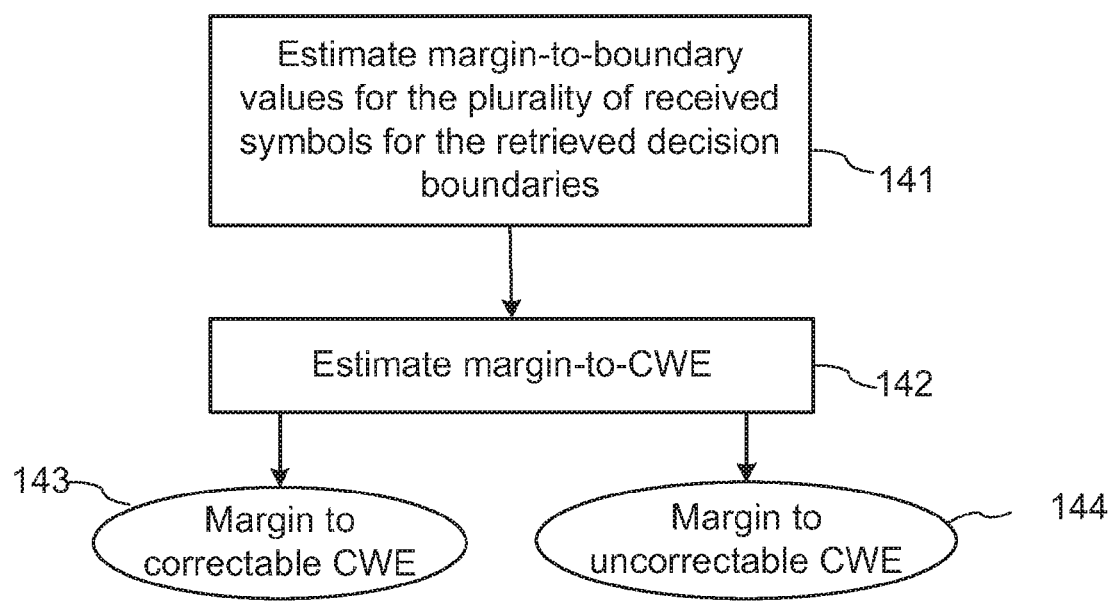
FIG. 7 is a flowchart illustrating general steps for computing margins before correctable and uncorrectable codeword errors occur according to an embodiment of the preset invention.
Figure 8:
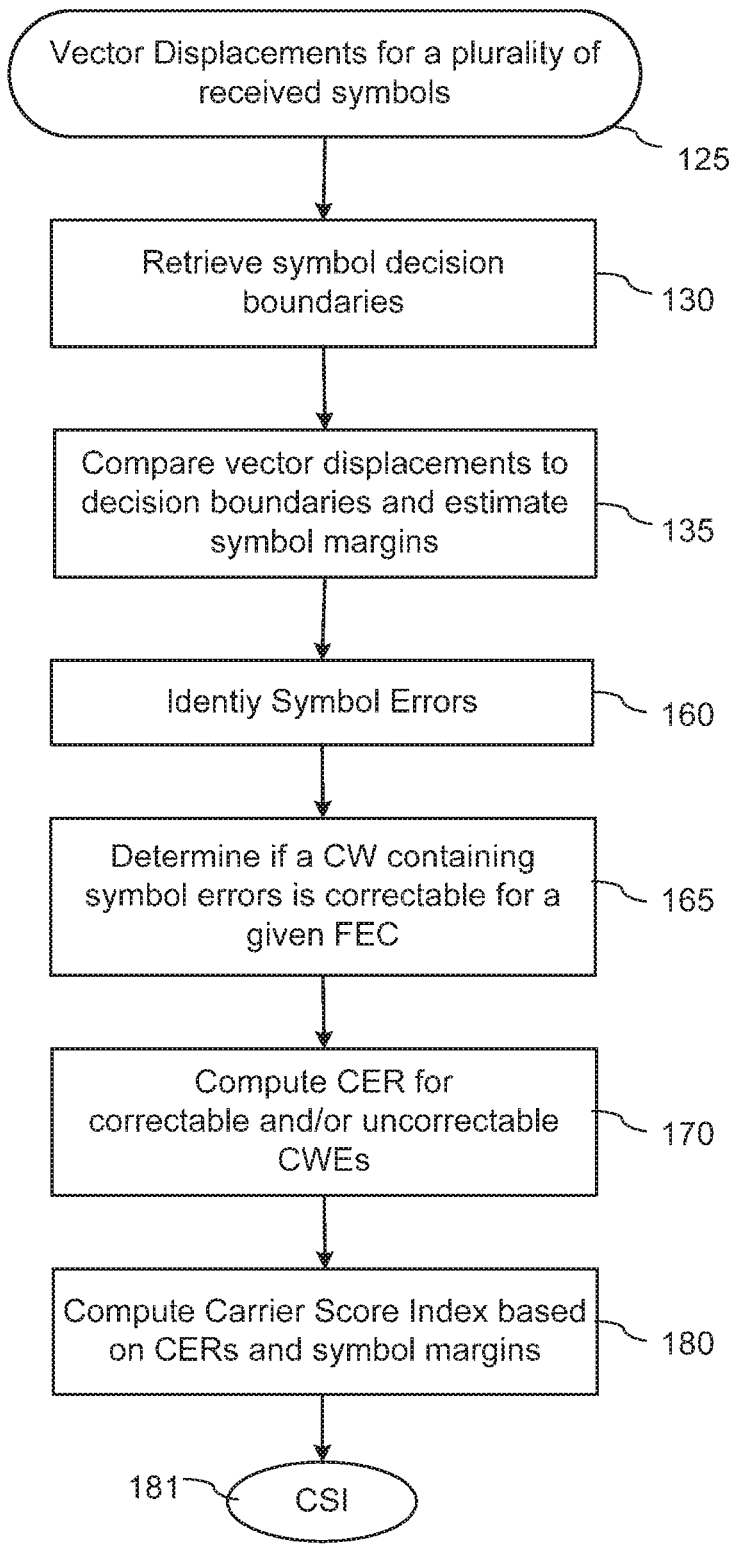
FIG. 8 is a flowchart illustrating computing a carrier index score according to an embodiment of the present invention.

With reference to FIG. 7, in one embodiment the step of evaluating the network performance includes step 141 of estimating margin-to-boundary values $S_{m2e}$ for the plurality of received symbols for the retrieved decision boundaries, and the step 142 of estimating a margin-to-codeword errors parameter such as a number or fraction of codewords within a predefined margin from having at least one symbol error. This step may include computing a margin to correctable CWE index or characteristic 143, and a margin to uncorrectable CWE index or characteristic 144, which may be for example in the form of a number or fraction of codewords within a predefined margin of having correctable and uncorrectable errors, respectively.

The symbol displacement vectors, the symbol margin-to-error values, the number or fraction, such as percentage, of symbols within a pre-defined margin from the error boundary, and the codeword error rates can be used as an indicator of the network's health. Accordingly, in one embodiment one or more of these parameters are provided to the output generator 255 for generating output data indicative of the projected performance of the network for the second modulation format. This can involve simply displaying one or more of the corresponding quantities to the user with a graphical user interface (GUI) 280, comparing the quantity to one or more threshold values, and/or generating a network score as a function of one or more of these quantities.

In one embodiment, a carrier index score (CIS) may be computed for the current and projected modulation formats for the carrier under test using correctable CER $R_{WEc}$, uncorrectable CER $R_{WEu}$, and the number or fraction, such as percentage, of symbols within a pre-defined margin from the error boundary N. By way of example, CSI may be computed as a pre-defined function of the following parameters:

$$CSI = F\{R_{WEu}, R_{WEc}, N_{3dBc}, N_{1dBc}\}, \qquad (1)$$

where the concrete form of the function F{ } may be selected based on network usage specifics. By way of example, a linear combination of the parameters may be used in one embodiment, with a lower score indicating a better projected network performance:

$$CSI = a_1 R_{WEu} + a_2 R_{WEc} + a_3 N_{3dBc} + a_4 N_{1dBc} \quad (2)$$

where $a_1$, $a_2$ $a_3$ and $a_4$ are suitably selected weighting coefficients. It will be appreciated that the function may be such that a higher score indicates a better projected network performance, for example by taking an inverse of the right hand side of equation (2) hereinabove, and it can also be scaled to vary in a pre-defined limits, for example between 0 and 10. In one embodiment, the MER value may further be accounted for when computing the score:

$$CSI = F\{R_{WEu}, R_{WEc}, N_{3dBc}, N_{1dBc}, MER\} \quad (3)$$

However, one skilled in the art will appreciate that other formulas for computing a network score or an index based on margin metrics of the present invention quantify relative proximity of symbols to decision boundaries and optionally combining them with conventional metrics such as MER and CER for the currently used format, and which combine margin metrics with projected codeword error rates at higher order modulation formats.

Accordingly, one aspect of the present invention provides a method of network evaluation that includes the following steps. At step 130, retrieve symbol decision boundaries for the first or second modulation format, or information related thereto, from DB memory; at step 135, compare vector displacements 125 for a plurality of received symbols to the decision boundaries for the first or second modulation format. At step 160, symbol errors are identified based on the comparison at step 135 as described hereinabove. At step 165, it is determined whether a CW that contains symbol errors is correctable using a pre-defined FEC algorithm. At step 170, CER values are computed for correctable and uncorrectable CWEs. At step 180, the carrier index score (CIS) 181 is computed using the correctable and uncorrectable CWEs, for example as described hereinabove, which may be then displayed on the GUI display 280.

Furthermore, the output generator 255 may generate alarms based on the margin metrics described hereinabove. By way of example, in one embodiment an alarm may be generated if a certain pre-defined percentage of packets, for example 10%, contain at least one symbol within a pre-defined margin from the decision boundary for the current modulation format. In one embodiment, the device could generate a minor alarm if 5% of packets have a symbol within 3 dBc, a major alarm if 10% of packets have a symbol within 2 dBc, and a critical alarm if 10% of packets have a symbol within 1 dBc of crossing a decision threshold resulting in symbol errors.

In one embodiment, the output generator 255 may generate a 'readiness' score for transition to the second modulation format. It may be, for example, in the form of a confidence score, such as "X % confident that a carrier is ready to support the higher modulation order with expected codeword error rates below a max acceptable level", which may be calculated based on projected CER values and the margin metrics collected over an extended period of time, for example over 1 to 7 days. By way of example, if there were no projected codeword errors at the second modulation format the network is being tested for, and the percentages of symbols within 1 dBc and 2 dBc of decision boundary for the second modulation format are within pre-defined limits, the network readiness may be assigned a 95% confidence value.

In one embodiment, the output generator 255 may compute, and display using the GUI display 280, a margin index for the first and/or second modulation format based on symbol margins for each received symbol sample Yr for a pre-defined signal duration, for example for a pre-defined number of received packets, so as to quantify the margin remaining before individual symbols cross decision boundaries resulting in codeword errors and/or BER. In one embodiment, the margin index is computed based on individual symbol displacements for individual received symbol and symbol proximity to nearest decision boundary. In one embodiment the margin index to be displayed varies from 0 to 10, with 10 being the best, communicating margin remaining before CWEs would occur.

In one embodiment, the margin index may be computed using a suitable formula, or a look-up table, which accounts for relative distance from each symbol to decision boundary, with a weighting factor or function applied to each symbol, so that the closer a raw symbol 99 is to a decision boundary the higher that it is weighted in the overall score. In one embodiment, the weighting is non-linear, for example exponential-like, with respect to the relative distance to decision boundaries. The margin index or score will therefore drop or rise most rapidly as any individual raw symbol 99 get very close to decision boundaries or if an increasing number of symbols get moderately close to decision boundaries.

By way of example only, the margin score or index may be computed on a per-packet basis as follows. First, the magnitude of the symbol displacement from its ideal location 55 within the cell is expressed relative to distance from the ideal symbol location 55 to the closest decision boundary 65, i.e. to the decision threshold d, so that if for example the raw symbol 99 is 0.9·d away from its ideal location 55, |D|=0.9. Next, a pre-determined number, for example 10, of symbols 99 that are closest to a decision boundary, i.e. have largest |D| values are selected from all symbols in the packet, and their relative displacement values |D| are super-linearly transformed, for example taken to the n-th power, where n could be 2, 3, 4, etc., and the resulting values are summed. For example, in one exemplary implementation, 10 largest relative displacements are cubed (n=3) and then summed to obtain the margin index $M_{in}$, i.e. $M_{in} = \Sigma |D|^3$, where the summation is taken over 10 "worst", i.e. most displaced, raw symbols in a packet. The margin index computed this way will range from zero in an ideal case where all the raw symbols in the packet are at their respective ideal locations, to up to almost 10 when 10 or more symbols are very close to a boundary. Of course, it will be appreciated that other formulas or algorithms could also be used for computing a margin index or score for individual packets or small groups of packets.

Advantageously, the margin index so designed is a metric that allows cable operators to take proactive actions before decision boundaries are crossed by symbols and before CWE's occur. Although prior art metrics such as MER and SNR do measure relative symbol spread, they are computed as an average of a large number of symbols, so that they do not provide information on relative location of individual symbols relative to decision boundaries. For example, if only a few out of thousands of symbols in a packet approach decision boundaries, the danger that exists for CWE's/BER, may not be detected by SNR/MER values, but will be captured by the margin index.

Turning back to FIG. 3, the guarded decision boundaries 85 for the first modulation format and the decision boundaries 75 for the second modulation format may be commonly viewed as a second set of decision boundaries that are tighter, i.e. define a smaller cell and therefore are associated with a smaller threshold, than the first set of decision boundaries 65 for the first modulation format. Accordingly, an aspect of the present invention provides a method for evaluating a network with the network tester 100 using the following general steps: a) receiving from the network a communication signal, for example in the form of a sequence of data packets, which is modulated using a first modulation format; b) demodulating the communication signal to obtain a sequence of received symbol samples; c) making hard decisions on the received symbol samples based on a first set of decision boundaries 65 that are associated with the first modulation format to obtain a sequence of modulation symbol decisions of the first modulation format corresponding to the sequence of received symbol samples; d) computing displacements of the received symbol samples with respect to the modulation symbol decisions obtained using the first set of decision boundaries 65; and, e) comparing the displacements of the received symbol samples obtained in step (d) to one or more decision thresholds associated with a second set of decision boundaries that are tighter than the first set of decision boundaries to obtain a measure of network performance in the absence of symbol errors for the first modulation format. In different embodiment, the one or more decision thresholds may include one or more of the decision thresholds $d_2$ or $d_3$ that are associated with the decision boundaries 75 for the second modulation format, and with the guarded set of decision boundaries 85 for the first modulation format. Step (e) may include computing the number or percentage of symbols or codewords that cross the second set of decision boundaries 75 or 85 and communicating it to the user either directly, or in a form of a performance index computed using that number or percentage, as a measure of a projected network performance. Here, the projected network performance may refer to either the projected symbol or CW error rate for the second modulation format, or to a margin remaining in the network before errors start to appear for the current modulation format. In one embodiment, the second set of decision boundaries, or the one or more decision thresholds related thereto, may be selectable by the user of the network tester 100, for example using the GUI.

The network tester 100 may be used for testing both upstream and downstream signals. In one embodiment, a plurality of network testers 100 may be connected to the network at different cable plant locations, and send their measurement results to the testing equipment 18, which collects them to evaluate network-level performance for the current modulation format and projected performance for new modulation formats. In one embodiment, two testers 100 connected to the network at different locations so that one is downstream from the other, are synchronized to perform margin and other measurements as described hereinabove on a same packet, thereby enabling a clear indicator of how much margin to boundary crossing is being contributed by different sections of HFC plant.

The above-described exemplary embodiments are intended to be illustrative in all respects, rather than restrictive, of the present invention, and each of the embodiments described hereinabove may include elements of other embodiments. For example, any characteristic or parameters or value or score that is described hereinabove with reference to the first or current modulation format may also be obtained for the second, or projected, modulation format, and vice versa. Thus the present invention is capable of many variations in detailed implementation that can be derived from the description contained herein by a person skilled in the art. All such variations and modifications are considered to be within the scope and spirit of the present invention as defined by the following claims.

We claim:

1. A method of evaluating network performance of a communication network, the method comprising:
   demodulating a quadrature amplitude modulation (QAM) signal received from the communication network to obtain a sequence of received symbols, the QAM signal having a first modulation format;
   determining, based on a set of decision boundaries for the first modulation format, a sequence of modulation symbol decisions corresponding to the sequence of received symbols;
   computing displacements of the received symbols with respect to the sequence of modulation symbol decisions; and
   predicting, based on the computed displacements, a network performance of a second modulation format different from the first modulation format.

2. The method of claim 1, wherein predicting the network performance of the second modulation format comprises:
   comparing the displacements of the received symbols to decision thresholds for a second set of decision boundaries associated with the second modulation format.

3. The method of claim 2, wherein comparing the displacements of the received symbols includes:
   determining whether the set of decision boundaries for the first modulation format is crossed;
   predicting whether the second set of decision boundaries will be crossed; and
   in response to a determination that the set of decision boundaries for the first modulation format is not crossed or a determination that the second set of decision boundaries will not be crossed, determining a remaining margin.

4. The method of claim 2, wherein the second set of decision boundaries is tighter than the set of decision boundaries for the first modulation format.

5. The method of claim 1, wherein evaluating the network performance comprises at least one of:
   computing a symbol margin-to-error value for each received symbol of the received symbols for the first modulation format using the set of decision boundaries; and
   computing a projected symbol margin-to-error value for each received symbol for the second modulation format using a second set of decision boundaries associated with the second modulation format.

6. The method of claim 5, further comprising computing a parameter representing a number of received symbols having the computed symbol margin-to-error value or the computed projected symbol margin-to-error value that is smaller than a pre-determined value.

7. The method of claim 5, wherein demodulating the QAM signal to obtain the sequence of received symbols comprises demodulating the QAM signal to obtain a series of received packets, the series of received packets including the sequence of received symbols, and
   wherein the method further comprises generating an alarm when a pre-defined percentage of the received packets have at least one received symbol within a pre-defined margin from a decision boundary of the set of decision boundaries for the first modulation format.

8. The method of claim 5, wherein predicting the network performance comprises:
computing a projected correctable codeword error rate (CER) for the second modulation format; and
computing a projected uncorrectable CER for the second modulation format.

9. The method of claim 8, further comprising at least one of:
computing a margin score based on at least one of the projected symbol margin-to-error value, the projected correctable CER, and the projected uncorrectable CER; and
displaying the margin score on a graphical user interface.

10. The method of claim 1, wherein predicting the network performance comprises:
predicting the network performance without transmitting a second QAM signal having the second modulation format.

11. An apparatus to evaluate network performance in a communication network, comprising:
a demodulator to demodulate a quadrature amplitude modulation (QAM) carrier signal received from the communication network to obtain a sequence of symbols, the QAM signal having a first modulation format;
a slicer to determine a sequence of modulation symbol decisions from the sequence of symbols according to a set of decision boundaries associated with the first modulation format; and
a symbol processor to:
compute displacements of the sequence of symbols with respect to the sequence of modulation symbol decisions; and
predict a network performance using the computed displacements and a second set of decision boundaries associated with a second modulation format.

12. The apparatus of claim 11, further comprising a receiver to receive from the communications network the QAM carrier signal.

13. The apparatus of claim 11, wherein to predict the network performance, the symbol processor is to:
compare the displacements of the sequence of symbols to one or more decision thresholds associated with the second set of decision boundaries, wherein the second modulation format has a modulation order different from a modulation order of the first modulation format.

14. The apparatus of claim 11, wherein to predict the network performance, the symbol processor is to:
determine whether the set of decision boundaries associated with the first modulation format is crossed;
predict whether the second set of decision boundaries will be crossed; and
in response to a determination that the set of decision boundaries associated with the first modulation format is not crossed or a determination that the second set of decision boundaries will not be crossed, determine a remaining margin.

15. The apparatus of claim 11, wherein for at least one of the first modulation format and the second modulation format, the symbol processor is to compute:
an error margin for each symbol of the sequence of symbols; and
a parameter representing a number of symbols having a error margin that is smaller than a pre-determined value.

16. The apparatus of claim 11, wherein the symbol processor is to compute, for the second modulation format, a projected correctable codeword error rate (CER) and a projected uncorrectable CER.

17. An apparatus to evaluate network performance in a communication network, comprising:
a demodulator to demodulate, using a first modulation format, a quadrature amplitude modulation (QAM) carrier signal received from the communication network to obtain a sequence of symbols;
a slicer to determine a sequence of modulation symbol decisions from the sequence of symbols according to a set of decision boundaries for the first modulation format; and
a symbol processor to:
quantify an error margin available at the first modulation format before decision boundaries of the set of decision boundaries associated with the first modulation format are crossed by symbols of the sequence of symbols.

18. The apparatus of claim 17, wherein the symbol processor is to predict network performance at a second modulation format, and wherein to predict the network performance at the second modulation format, the symbol processor is to:
compute displacements of the sequence of symbols with respect to the sequence of modulation symbol decisions based on the set of decision boundaries for the first modulation format; and
compare the displacements to one or more decision boundaries associated with a second set of decision boundaries associated with the second modulation format.

19. The apparatus of claim 18, wherein the first modulation format has a modulation order and the second modulation format has a modulation order higher than the modulation order of the first modulation format, and wherein symbol processor is to:
predict whether the second set of decision boundaries for the second modulation format having the higher modulation order will be crossed; and
in response to a determination that the second set of decision boundaries will not be crossed, determine a remaining margin.

20. The apparatus of claim 18, wherein the symbol processor is to compute, for the second modulation format, a projected correctable codeword error rate (CER) and a projected uncorrectable CER.

* * * * *